United States Patent [19]

Pauwels et al.

[11] Patent Number: 5,774,464
[45] Date of Patent: Jun. 30, 1998

[54] METHOD FOR MANAGEMENT OF MULTICAST CONNECTIONS AND SWITCHING NODE TERMINATION REALIZING SAID METHOD

[75] Inventors: Ludwig Alice Julienne Pauwels, Beveren; Pascal Albert Emile Lefebvre, Brussels, both of Belgium

[73] Assignee: Alcatel Alsthom Compagnie Generale d'Electricite, Paris, France

[21] Appl. No.: 744,333

[22] Filed: Nov. 7, 1996

[30] Foreign Application Priority Data

Nov. 7, 1995 [EP] European Pat. Off. .............. 95203016

[51] Int. Cl.⁶ .................................................. H04L 12/56
[52] U.S. Cl. .......................................... 370/390; 370/392
[58] Field of Search ................................... 370/388, 390, 370/394, 399, 389, 392, 395, 397, 400

[56] References Cited

U.S. PATENT DOCUMENTS

| 4,813,038 | 3/1989 | Lee ............................................. 370/60 |
| 5,119,369 | 6/1992 | Tanabe et al. ........................... 370/392 |
| 5,210,743 | 5/1993 | Eilenberger et al. ................... 370/442 |
| 5,303,233 | 4/1994 | Sugawara ................................. 370/60 |
| 5,390,174 | 2/1995 | Jugel ....................................... 370/392 |
| 5,410,540 | 4/1995 | Aiki et al. .............................. 370/395 |
| 5,436,893 | 7/1995 | Barnett ................................... 370/392 |
| 5,461,615 | 10/1995 | Henrion ................................. 370/395 |

OTHER PUBLICATIONS

"A Large–Scale Multicast Output Buffered ATM Switch", H. Chao et al, *IEEE Globecom '93*, Nov. 29–Dec. 2, 1993, Houston TX, pub. Nov. 29, 1993, pp. 34–41.

"Design and Technology Aspects of VLSI's for ATM Switches", T. Banniza et al, *IEEE Journal on Selected Areas in Communications*, vol. 9, No. 8, Oct. 1991, pp. 1255–1264.

*Primary Examiner*—Chau Nguyen
*Attorney, Agent, or Firm*—Ware, Fressola, Van Der Sluys & Adolphson LLP

[57] ABSTRACT

The method is used in a switching network over which data packets are transferred and which includes a plurality of switching nodes with switching node terminations (SNT) and associates in each one of the switching node terminations (SNT) internal header information (IHI) included in an internal data packet received by the switching node termination and identifying an internal connection within the switching node and ending in the switching node termination, to external header information (EHI) included in an external data packet and identifying an outgoing external connection external to the switching node and originating from the switching node termination. The internal header information (IHI) includes a connection reference number (CRN) and a transfer type is associated to the internal connection. The method comprises three steps:

a. determining the transfer type;

b. associating to the connection reference number (CRN) and based on the transfer type a transfer type independent connection reference number (TTI-CRN) which is locally allocated by the switching node termination (SNT); and c. associating to the transfer type independent connection reference number (TTI-CRN) the external header information (EHI).

10 Claims, 2 Drawing Sheets

METHOD FOR MANAGEMENT OF MULTICAST CONNECTIONS AND SWITCHING NODE TERMINATION REALIZING SAID METHOD

TECHNICAL FIELD

The present invention relates to a method for use in a switching network which includes a plurality of switching nodes with switching node terminations for associating in a switching node termination internal header information to external header information, to a switching node termination realizing said method and to a switching node and a switching network including this switching node termination.

BACKGROUND OF THE INVENTION

For a switching network over which data packets are transferred, and which includes a plurality of switching nodes with switching node terminations, it is already known to associate in each one of the switching node terminations internal header information included in an internal data packet identifying an internal connection within the switching node and ending in the switching node termination, to external header information included in an external data packet and identifying an outgoing external connection external to the switching node and originating from the switching node termination. The internal header information includes a connection reference number and a transfer type associated to the internal connection.

Such a method and a switching node termination realizing the latter method are already known in the art, i.e., from the article "Design and Technology Aspects of VLSI's for ATM Switches", written by Thomas R. Banniza, Gert J. Eilenberger, Bart Pauwels and Y. Therasse, and published in *IEEE Journal on Selected Areas In Communication*, Vol. 9, No. 8, October 1991, from page 1255 to page 1264. As described in paragraph III.B of this article, a termination link board, which is similar to the switching node termination of the present invention, and which is included in this multipath self-routing switching network performs the conversion between multislot cells, i.e., data packets used internally in the switching network, and ATM cells, i.e., data packets used externally to the switching network. More specifically, in paragraph IV.B.4, a TMC-out VLSI, included in the switching node termination uses an internal reference number included in the internal header information of the multislot cell to access the external header information of the ATM cell. The internal reference number is equivalent to the connection reference number mentioned above and identifies an internal connection within the switching node.

Although it is not explicitly mentioned in the article, it is evident to a person skilled in the art that the earlier-mentioned association will be mostly realized by means of an association table.

The connection reference number associated to a unicast connection is managed by the destination termination link board where the unicast connection is ending. On the contrary, since the connection reference number associated to a multicast connection is the same number for all destination termination link boards where the multicast connection is ending, the multicast connection reference numbers are managed centrally. Blocking occurs when a common multicast connection reference number cannot be found free at all the multicast destination termination link boards. To avoid the latter blocking which is a result of the different ways of managing connection reference numbers for different types of transfer, the association table could be divided into two subranges: a unicast subrange and a multicast subrange, with the size of both ranges the same for all destination termination link boards.

However, such a partitioning between unicast and multicast would make the number of unicast connections that can be ending on a destination termination link board directly dependent of the number of multicast connections, even if the probability that a multicast connection would terminate on all destination termination link boards is very low. As a result this relationship would reduce the amount of potential unicast connections on the destination termination link board to the size of the unicast subrange and would reduce the number of multicast connections within the multipath self-routing switching network to the size of the multicast subrange.

DISCLOSURE OF INVENTION

An object of the present invention is to provide a method for enabling the above association and a network node termination realizing this method, such as the known one but which does not have the above drawback, i.e., in which there is no relationship between the different kinds of transfer type of the internal connections used inside the switching network and the external header information of the outgoing external connections.

According to a first aspect of the present invention, a method for use in a switching network over which data packets are transferred and which includes a plurality of switching nodes, a switching node termination in at least one switching node, for associating in said switching node termination internal header information included in an internal data packet received by said switching node termination and identifying an internal connection within said at least one switching node and ending in said switching node termination, to external header information included in an external data packet and identifying an outgoing external connection external to said at least one switching node and originating from said switching node termination, said internal header information including a connection reference number and a transfer type associated to said internal connection, is characterized in that said method comprises the steps of:
  a. determining said transfer type;
  b. associating to said connection reference number and based on said transfer type a transfer type independent connection reference number which is allocated by said switching node termination; and
  c. associating to said transfer type independent connection reference number said external header information.

According to a second aspect of the present invention, a switching node termination included in a switching node of a switching network over which data packets are transferred, said switching node termination adapted to associate internal header information included in an internal data packet received by said switching node termination and identifying an internal connection within said switching node and ending in said switching node termination, to external header information included in an external data packet and identifying an outgoing external connection external to said switching node and originating from said switching node termination, said internal header information including a connection reference number and a transfer type associated to said internal connection, is characterized in that said switching node termination comprises:
  a. determination means to determine said transfer type;
  b. first association means to associate based on said transfer type said connection reference number to a transfer type independent connection reference number which is allocated by said switching node termination; and c. second association means to associated to said transfer type independent connection reference number said external header information.

According to a third aspect of the present invention, a switching node for a switching network over which data packets are transferred, is characterized in that said switching node includes a switching node termination, adapted to associate internal header information included in an internal data packet received by said switching node termination and identifying an internal connection within said switching node and ending in said switching node termination, to external header information included in an external data packet and identifying an outgoing external connection external to said switching node and originating from said switching node termination, said internal header information including a connection reference number and a transfer type associated to said internal connection, characterized in that said switching node termination comprises:

a. determination means to determine said transfer type;

b. first association means to associate based on said transfer type said connection reference number to a transfer type independent connection reference number which is allocated by said switching node termination; and c. second association means to associated to said transfer type independent connection reference number said external header information.

According to a fourth aspect of the present invention, a switching network having a plurality of switching nodes, is characterized in that said switching network includes at least one switching node having a switching node termination adapted to associate internal header information included in an internal data packet received by said switching node termination and identifying an internal connection within said switching node and ending in said switching node termination, to external header information included in an external data packet and identifying an outgoing external connection external to said switching node and originating from said switching node termination, said internal header information including a connection reference number and a transfer type associated to said internal connection, characterized in that said switching node termination comprises:

a. determination means to determine said transfer type;

b. first association means to associate based on said transfer type said connection reference number to a transfer type independent connection reference number which is allocated by said switching node termination; and c. second association means to associated to said transfer type independent connection reference number said external header information.

Indeed, by using an additional association table, similar to the first association means to associate, based on the transfer type, the connection reference number to a transfer type independent connection reference number which is locally managed by the switching node termination and by using this transfer type independent connection reference number to access the external header information, a decoupling is realized between the different kinds of transfer type and the external header information, i.e, the external header information is obtained in a way which is independent of the different kinds of transfer type of the internal connections.

As a result thereof, the maximum amount of potential unicast connections ending on a destination termination link board is only limited by the maximum number of possible connections ending on the destination termination link board itself and the maximum amount of potential multicast connections within a multipath self-routing switching network is only limited by the size of the additional association table which can be bigger than the size of the maximum possible connections ending on a destination termination link board. To be noted that an additional association table has to be foreseen for each transfer type.

A possible way of realizing the step of determining the transfer type of the present method is to make use of a transfer pattern code included in the internal header information which identifies the type of transfer. In this way, the transfer type is determined by interpreting the transfer pattern code.

To reduce the number of different kinds of connection reference numbers, the connection reference numbers which are associated to unicast transfer, i.e., a type of transfer using point-to-point connections, are used as transfer type independent connection reference number. This can be done because the allocation of the unicast connection reference numbers is also managed locally by the switching node termination. The connection reference number associated to a unicast transfer constitutes said transfer type independent connection reference number.

A further feature of the present invention is that one of the different transfer types is a multicast transfer or point-to-multipoint connections.

These and other objects, features and advantages of the present invention will become more apparent in light of the detailed description of a best mode embodiment thereof, as illustrated in the accompanying drawing.

BEST MODE FOR CARRYING OUT THE INVENTION

First, a functional description of the blocks shown in FIG. 1 will be given. Based on this description, implementation of the functional blocks in FIG. 1 will be evident to any person skilled in the art. In addition, the method of the invention, i.e., the working of the switching node termination SNT will be described in further detail.

Figure 1:
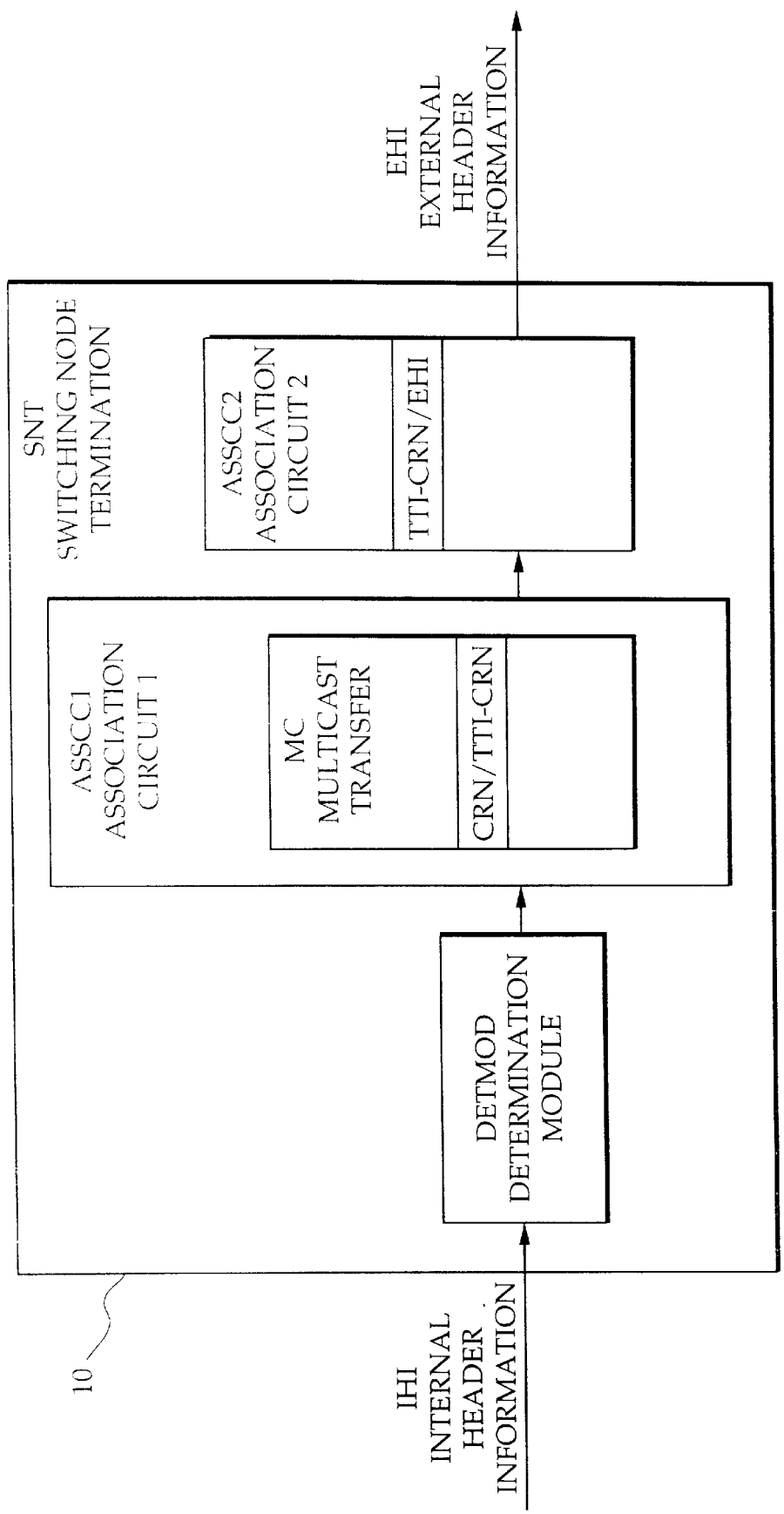
FIG. 1 shows an embodiment representing a switching node termination SNT adapted to associate internal header information IHI to external header information EHI according to the invention.
Figure 2:
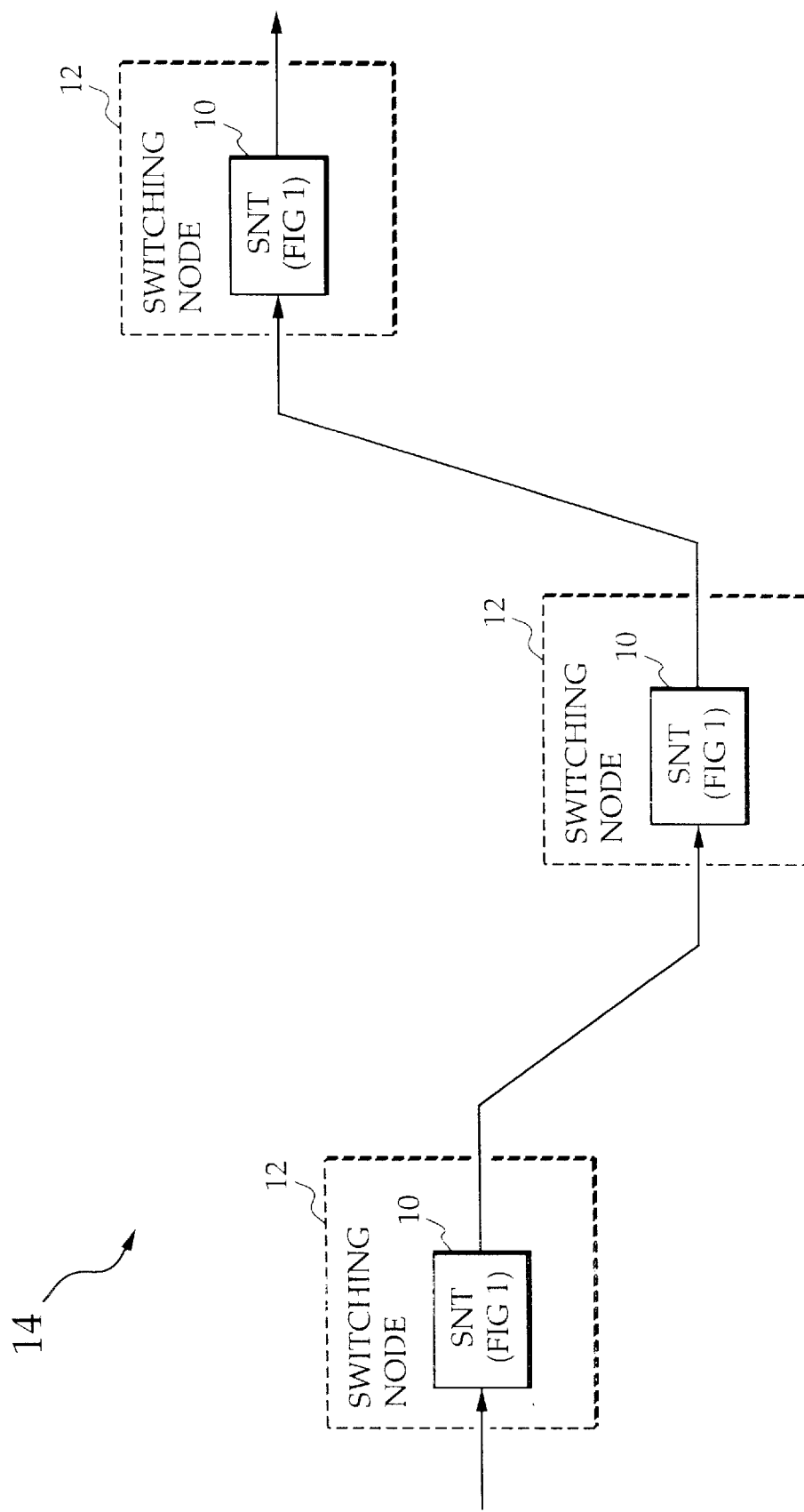
FIG. 2 shows a switching network having a plurality of switching nodes, at least one of which has a switching node termination.

The embodiment of a switching node termination 10, shown in FIG. 1, is used in at least one of a plurality of switching nodes 12 of a switching network 14, as shown in FIG. 2, over which data packets are transferred. The internal header information IHI, included in an internal data packet received by the switching node termination, identifies an internal connection within the switching node which is ending in the switching node termination. The external header information EHI, included in an external data packet, identifies an outgoing external connection of the switching node which is originating from the switching node termination. The internal header information IHI includes a connection reference number CRN, and a transfer type is associated to each internal connection. Such a type is, for instance, a unicast type connection, i.e., a type of transfer using point-to-point connections or a multicast type connection, i.e., a type of transfer using point-to-multipoint connections.

The embodiment shown in FIG. 1 includes a determination module DETMOD, a first association circuit ASSCC1 and a second association circuit ASSCC2.

The determination module DETMOD is provided to determine the transfer type of the internal connection. Since the internal header information IHI, applied to this block, includes a transfer pattern code which characterizes the transfer type of the internal connection, the necessary information to determine the transfer type is available and is used. Interpretation means to interpret the transfer pattern code and to determine the transfer type are included in the determination module DETMOD.

It has to be remarked that, although the use of this transfer pattern code is mentioned in this preferred embodiment to determine the transfer type, it will be evident to any person skilled in the art that the invention is not restricted to switching node terminations SNT wherein the interpretation of this transfer pattern code is applied.

The first association circuit ASSCC1 is included to associate, based on the transfer type, the connection reference number CRN to a transfer type independent connection reference number TTI-CRN. In this first association circuit ASSCC1 the connection reference number CRN is used to get access to the transfer type independent connection reference number TTI-CRN via a transfer type specific table. In the drawing only the transfer type specific table for multicast transfer MC is shown.

It has to be noted here that because the connection reference numbers of multicast connections are identifying a multicast connection which is ending on different switching node terminations, these connection reference numbers are managed centrally in the network. But the transfer type independent connection reference numbers are identifying internal connections which are ending on a particular switching node termination, i.e., a branch of a multicast connection ending on this switching node termination. Therefore, these transfer type independent connection reference numbers are managed, locally, by the switching node termination.

As already mentioned before, to reduce the number of different kinds of connection reference numbers, the transfer type independent connection reference number corresponds to the connection reference number associated to the unicast transfer, which is also managed, locally, by the switching node termination.

It has to be remarked that, although the connection reference number of unicast transfer is used in this embodiment as transfer type independent connection reference number, the present invention is not restricted to switching node terminations wherein such a choice is made.

The second association circuit ASSCC2 is included to associate the transfer type independent connection reference number TTI-CRN to the external header information EHI. The transfer type independent connection reference number TTI-CRN is used to get access to the external header information EHI, making use of a transfer table.

The principle working of the switching node termination SNT will be explained in the following paragraphs with respect to unicast and multicast transfer, the working with respect to other types of transfer being identical.

It has to be noted that although in this preferred embodiment the working for two different transfer types is described: unicast transfer and multicast transfer, the different types of transfer within the switching node of the invention are not restricted to these two types.

An internal data packet, identifying an internal connection within the switching node, is received by the switching node termination SNT.

During a first step, the transfer pattern code included in the internal header information IHI which is included in this data packet is used by the determination module DETMOD to determine the transfer type of the internal connection.

During a second step and in case that the transfer type was determined as a multicast transfer, the connection reference number CRN, also included in the internal header information IHI, is associated to the transfer type independent connection reference number TTI-CRN by the first association circuit using the transfer type dependent table for multicast transfer MC.

Also during the second step, but in case that the transfer type was determined as unicast transfer, the connection reference number CRN of the unicast transfer, used as transfer type independent connection reference number TTI-CRN, is associated to the transfer type independent connection reference number TTI-CRN, say, to itself.

During a third step, the transfer type independent connection reference number TTI-CRN is associated by the second association circuit ASSCC2 to the external header information EHI, thereby identifying an outgoing external connection external to the switching node and originating from the switching node termination.

While the principles of the invention have been described above in connection with specific apparatus, it is to be clearly understood that this description is made only by way of example and not as a limitation on the scope of the invention.

We claim:

1. A method for use in a switching network over which data packets are transferred and which includes a plurality of switching nodes, a switching node termination (SNT) in at least one switching node, for associating in said switching node termination (SNT) internal header information (IHI) included in an internal data packet received by said switching node termination and identifying an internal connection within said at least one switching node and ending in said switching node termination, to external header information (EHI) included in an external data packet and identifying an outgoing external connection external to said at least one switching node and originating from said switching node termination, said internal header information including a connection reference number (CRN) and a transfer type associated to said internal connection, characterized in that said method comprises the steps of:
   a. determining said transfer type;
   b. associating to said connection reference number (CRN) and based on said transfer type a transfer type independent connection reference number (TTI-CRN) which is allocated by said switching node termination (SNT); and
   c. associating to said transfer type independent connection reference number said external header information (EHI).

2. A method according to claim 1, characterized in that said transfer type is characterized by a transfer pattern code included in said internal header information, said step of determining carried out by interpreting said transfer pattern code.

3. A method according to claim 1, characterized in that said connection reference number is associated to a unicast transfer and constitutes said transfer type independent connection reference number (TTI-CRN).

4. A method according to claim 1, characterized in that said transfer type is a multicast transfer type.

5. A switching node termination (SNT) included in a switching node of a switching network over which data packets are transferred, said switching node termination (SNT) adapted to associate internal header information (IHI) included in an internal data packet received by said switching node termination (SNT) and identifying an internal connection within said switching node and ending in said switching node termination, to external header information (EHI) included in an external data packet and identifying an outgoing external connection external to said switching node and originating from said switching node termination (SNT), said internal header information (IHI) including a connection reference number (CRN) and a transfer type associate to said internal connection, characterized in that said switching node termination (SNT) comprises:

a. determination means (DETMOD) to determine said transfer type;

b. first association means (ASSCC1) to associate based on said transfer type said connection reference number (CRN) to a transfer type independent connection reference number (TTI-CRN) which is allocated by said switching node termination (SNT); and c. second association means (ASSCC2) to associated to said transfer type independent connection reference number said external header information (EHI).

6. A switching node termination (SNT) according to claim 5, characterized in that said transfer type is characterized by a transfer pattern code included in said internal header information (IHI) and that said determination means include interpretation means to interpret said pattern code and to thereby determine said transfer type.

7. A switching node termination (SNT) according to claim 5, characterized in that said connection reference number associated to a unicast transfer constitutes said transfer type independent connection reference number (TTI-CRN).

8. A switching node termination (SNT) according to claim 5, characterized in that said transfer type is a multicast transfer type.

9. A switching node for a switching network over which data packets are transferred, wherein said switching node includes a switching node termination (SNT), adapted to associate internal header information (IHI) included in an internal data packet received by said switching node termination (SNT) and identifying an internal connection within said switching node and ending in said switching node termination, to external header information (EHI) included in an external data packet and identifying an outgoing external connection external to said switching node and originating from said switching node termination (SNT), said internal header information (IHI) including a connection reference number (CRN) and a transfer type associated to said internal connection, characterized in that said switching node termination (SNT) comprises:

a. determination means (DETMOD) to determine said transfer type;

b. first association means (ASSCC1) to associate based on said transfer type said connection reference number (CRN) to a transfer type independent connection reference number (TTI-CRN) which is allocated by said switching node termination (SNT); and c. second association means (ASSCC2) to associate to said transfer type independent connection reference number said external header information (EHI).

10. A switching network having a plurality of switching nodes, wherein said switching network includes at least one switching node having a switching node termination (SNT) adapted to associate internal header information (IHI) included in an internal data packet received by said switching node termination (SNT) and identifying an internal connection within said switching node and ending in said switching node termination, to external header information (EHI) included in an external data packet and identifying an outgoing external connection external to said switching node and originating from said switching node termination (SNT), said internal header information (IHI) including a connection reference number (CRN) and a transfer type associated to said internal connection, characterized in that said switching node termination (SNT) comprises:

a. determination means (DETMOD) to determine said transfer type;

b. first association means (ASSCC1) to associate based on said transfer type said connection reference number (CRN) to a transfer type independent connection reference number (TTI-CRN) which is allocated by said switching node termination (SNT); and c. second association means (ASSCC2) to associate to said transfer type independent connection reference number said external header information (EHI).

\* \* \* \* \*